US011332622B2

(12) United States Patent
Lee et al.

(10) Patent No.: US 11,332,622 B2
(45) Date of Patent: May 17, 2022

(54) METHOD FOR PREPARING A CARBON BLACK OF HIGH RESISTIVITY AND A CARBON BLACK OF HIGH RESISTIVITY PREPARED BY THIS METHOD

(71) Applicant: OCI COMPANY LTD., Seoul (KR)

(72) Inventors: Jae-Seok Lee, Seongnam-si (KR); Jae-Heung Park, Seongnam-si (KR); Su-Jin Son, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 113 days.

(21) Appl. No.: 16/232,607

(22) Filed: Dec. 26, 2018

(65) Prior Publication Data
US 2019/0194470 A1 Jun. 27, 2019

(30) Foreign Application Priority Data
Dec. 27, 2017 (KR) .......................... 10-2017-0180821

(51) Int. Cl.
*C09C 1/56* (2006.01)
*C09C 1/50* (2006.01)
*C09C 1/60* (2006.01)

(52) U.S. Cl.
CPC .................. *C09C 1/50* (2013.01); *C09C 1/56* (2013.01); *C09C 1/565* (2013.01); *C09C 1/60* (2013.01); *C01P 2004/50* (2013.01); *C01P 2006/12* (2013.01); *C01P 2006/40* (2013.01)

(58) Field of Classification Search
CPC ................................................... C09C 1/565
See application file for complete search history.

(56) References Cited

U.S. PATENT DOCUMENTS

| 3,959,008 | A  | * | 5/1976 | Warner | ..................... C09C 1/50 |
| | | | | | 106/478 |
| 6,471,763 | B1 | * | 10/2002 | Karl | .......................... C09C 1/54 |
| | | | | | 106/478 |
| 7,220,304 | B2 | * | 5/2007 | Momose | ................. C09C 1/565 |
| | | | | | 106/31.6 |
| 8,420,044 | B2 | * | 4/2013 | Bergemann | .......... C09D 11/324 |
| | | | | | 423/449.2 |
| 8,501,148 | B2 | * | 8/2013 | Belmont | .................. C09C 1/48 |
| | | | | | 423/449.1 |
| 8,574,527 | B2 | * | 11/2013 | Stenger | ................. B01J 8/1827 |
| | | | | | 423/345 |
| 8,728,432 | B2 | * | 5/2014 | Arai | ....................... C09C 1/565 |
| | | | | | 423/449.2 |
| 10,920,086 | B2 | * | 2/2021 | Lee | ........................... C09C 1/50 |
| 2006/0041053 | A1 | | 2/2006 | Kamata et al. | |
| 2016/0322634 | A1 | | 11/2016 | Korchev et al. | |

FOREIGN PATENT DOCUMENTS

CN    1729429 A    2/2006

OTHER PUBLICATIONS

Chinese Office Action dated Mar. 5, 2021, in connection with the Chinese Patent Application No. citing the 201811540453.8 above reference(s).

* cited by examiner

*Primary Examiner* — Stuart L Hendrickson
(74) *Attorney, Agent, or Firm* — Hauptman Ham, LLP

(57) ABSTRACT

The present invention generally relates to a method for preparing a carbon black of high resistivity through the surface treatment of the carbon black which exhibits conductivity, and a carbon black prepared by this method.

7 Claims, 2 Drawing Sheets

METHOD FOR PREPARING A CARBON BLACK OF HIGH RESISTIVITY AND A CARBON BLACK OF HIGH RESISTIVITY PREPARED BY THIS METHOD

CROSS-REFERENCE TO RELATED APPLICATIONS

This application claims the priority of Korean Patent Application No. 10-2017-0180821 filed on Dec. 27, 2017 in the Korean Intellectual Property Office, the disclosure of which is hereby incorporated by reference in its entirety.

TECHNICAL FIELD

The present invention relates to a method for preparing a carbon black of high resistivity through the surface treatment of the carbon black which generally exhibits conductivity, and a carbon black prepared by this method.

TECHNICAL BACKGROUND OF INVENTION

A carbon black refers to aggregates of very fine spherical particles obtained by incomplete combustion of various hydrocarbons or compounds containing a carbon. The carbon black forms primary particles in a reaction furnace, and these primary particles are fused together to form aggregates in the form of grapevine clusters.

The carbon black can be classified into a conductive carbon black which is mainly used as a conductive material of a secondary battery and a carbon black of high resistivity which is reduced or suppressed in conductivity for application to a display device, depending on the electrical characteristics thereof.

The carbon black of high resistivity is suitable for use as a material for forming a black matrix or a spacer for a liquid crystal display device as well as an organic light-emitting display device.

The carbon black is used by dispersing it as a black-coloring material in a resist or a resin for forming a black matrix or a spacer. In case the conductive carbon black is generally used as this black-coloring material, the black matrix or the spacer exhibits conductivity, which may result in a risk of adverse effects on the characteristics of the display device.

Therefore, there has been a demand for the development of a carbon black which exhibits an excellent dispersibility together with a suppressed conductivity, i.e., a high resistivity, on the resist or the resin for forming the black matrix or the spacer.

DISCLOSURE OF INVENTION

Problem to be Solved

As described above, the present invention is aimed to provide a method for preparing a carbon black used as a black-coloring material on a resist or a resin for forming a black matrix or a spacer which is applied to various display devices, and to provide a carbon black prepared by the method.

In particular, it is an object of the present invention to provide a method for preparing a carbon black of high resistivity by increasing the content of the surface-volatile matter of the carbon black, and a carbon black prepared by the method.

Means for Solving the Problems

According to one aspect of the present invention, there is provided a method for preparing a carbon black of high resistivity, comprising the steps of: (a) producing a carbon black in a combustion reactor; and (b) transferring the carbon black produced in the combustion reactor to an oxidation reactor and oxidizing the carbon black by adding ozone to the oxidation reactor.

The combustion reactor comprises: (1) a first reaction zone for burning a fuel oil in the combustion reactor using a combustion-promoting oxygen of high temperature to reach a reaction temperature simultaneously while forming stream of a combustion gas, (2) a second reaction zone located downstream of the first reaction zone and producing a carbon black by reacting the stream of the combustion gas with a raw material oil, and (3) a third reaction zone located downstream of the second reaction zone and lowering the temperature of the carbon black produced in the second reaction zone, wherein the temperature of the first reaction zone may be in the range from 1,200 to 1,500° C.

Further, according to another aspect of the present invention, there is provided a carbon black of high resistivity prepared by the above-described method.

Effect of Invention

A carbon black prepared according to the present invention can reduce the conductivity thereof without performing a process of coating the surface of the carbon black with a separate resin due to the content of the increased volatile matter of the surface, thereby securing the carbon black of high resistivity.

Further, according to the present invention, since it is possible to control the content of the surface-volatile matter of a carbon black in the step of producing the carbon black from a raw material and oxidizing the same, without performing any additional process, the present invention is advantageous in terms of process difficulty and process cost.

DETAILED DESCRIPTION OF INVENTION

Figure 1:
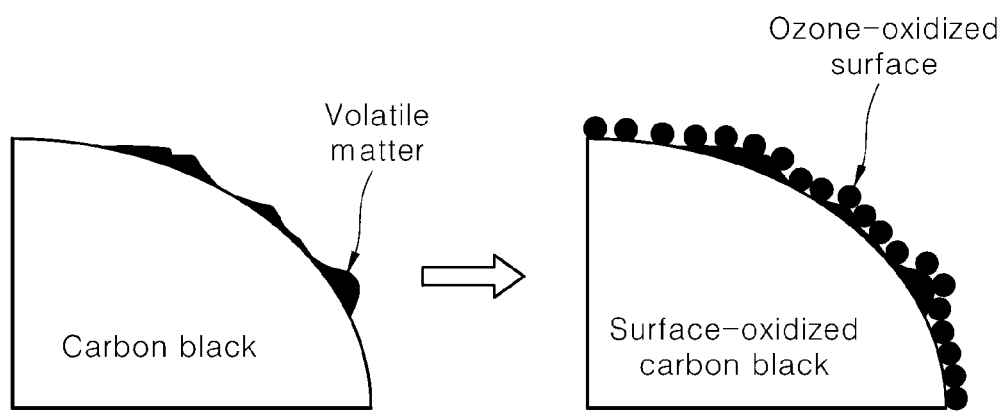
FIG. 1 is a schematic view showing a process for preparing a carbon black of high resistivity through the surface treatment of the carbon black, according to an embodiment of the present invention.
Figure 2:
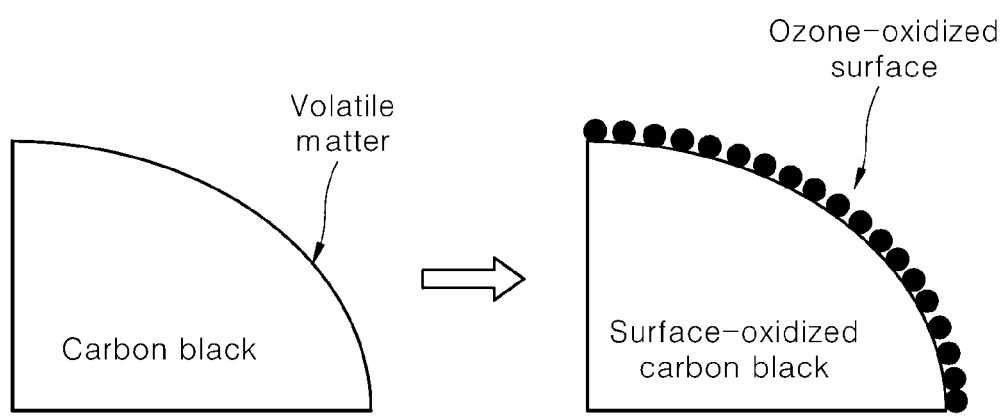
FIG. 2 is a schematic view showing a process of preparing a carbon black without carrying out the surface treatment of the carbon black.
Figure 3:
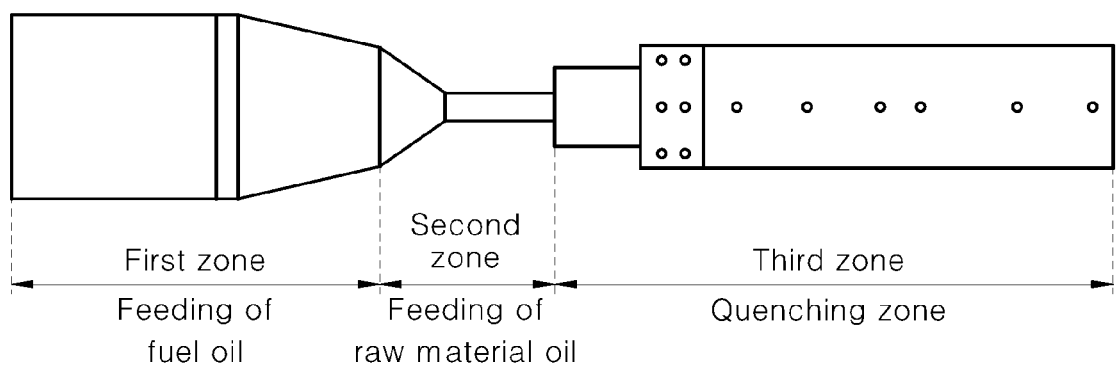
FIG. 3 schematically illustrates a combustion reactor used to produce a carbon black in accordance with one embodiment of the present invention.

To facilitate a better understanding of the present invention, certain terms are defined herein for the purpose of convenience. Unless otherwise defined herein, the scientific and technical terms used herein may have the meaning as commonly appreciated by a person who has an ordinary skill in the art.

Also, unless the context clearly indicates otherwise, the singular form of the term may include plural forms thereof, and plural forms of terms may include singular form thereof.

Hereinafter, a method for preparing a carbon black according to an embodiment of the present invention will be described in detail.

According to an aspect of the present invention, there is provided a method for preparing a carbon black of high resistivity, comprising the steps of: (a) producing a carbon black in a combustion reactor; and (b) transferring the carbon black produced in the combustion reactor to an oxidation reactor and oxidizing the carbon black by adding ozone to the oxidation reactor.

Herein, the carbon black of high resistivity means the carbon black having reduced conductivity (or increased resistivity) compared to the conventional carbon black. In general, when a polar functional group existing on the surface of the carbon black is increased through oxidation treatment to the surface of the carbon black, the movement of electrons is restricted by the polar functional group so that the conductivity of the carbon black is lowered.

However, the present invention proposes a method capable of improving the resistivity of the carbon black by enhancing the content of the surface-volatile matter of the carbon black in the step of producing the carbon black from a raw material before the surface oxidation treatment of the carbon black.

The step (a) is the process of producing a carbon black from a raw material by using a combustion reactor, and the carbon black can be produced by heat treatment after a raw material oil, a fuel oil and a combustion-promoting gas are injected into the combustion reactor.

The fuel oil is the one burned to reach a high temperature which can correspond to the reaction conditions for producing the carbon black and may include one of those selected from the groups consisting of a liquid fuel such as a diesel, a kerosene, a bunker C oil, a petroleum-based FCC, EBO, a creosote, a soft pitch, a coal-based coal tar, a naphthalene, a carboxylic acid, FCC and the likes, a gaseous fuel such as a natural gas and a coal gas, and a combination thereof.

The raw material oil is a substance that forms a seed of the carbon black and may include one of those selected from the groups consisting of a liquid raw material such as a gasoline, a diesel, a kerosene, a bunker C oil, a petroleum-based FCC, EBO, a creosote, a soft pitch, a coal-based coal tar, a naphthalene, a carboxylic acid, FCC and the likes, a gaseous raw material such as a natural gas and a coal gas, and a combination thereof.

The combustion-promoting gas may be, for example, an air or an oxygen.

Specifically, The combustion reactor can be classified into (1) a first reaction zone for burning a fuel oil in the combustion reactor using a combustion-promoting oxygen of high temperature to reach a reaction temperature simultaneously while forming stream of a combustion gas, (2) a second reaction zone located downstream of the first reaction zone and producing a carbon black by reacting the stream of the combustion gas with a raw material oil, and (3) a third reaction zone, i.e., a quenching zone, located downstream of the second reaction zone and lowering the temperature of the carbon black produced by incomplete combustion at a high temperature.

Typically, the temperature in the first reaction zone for forming the stream of the combustion gas in the production of the carbon black is preferably 1,600° C. or higher. The higher the temperature of the combustion gas stream, the better the productivity of the carbon black. Further, although it is desirable that the temperature of the combustion gas stream is higher, it should be appropriately determined at a temperature of 1,600° C. or higher in consideration of the heat resistance of the combustion reactor.

However, the temperature of the first reaction zone according to an embodiment of the present invention is in the range from 1,200 to 1,500° C., which is about 5 to 10% lower than the typical temperature of the first reaction zone in the combustion reactor for producing the carbon black.

Therefore, according to the embodiment of the present invention, unlike the first reaction zone for producing the typical carbon black, the incomplete combustion of the raw material oil in the second reaction zone can be further promoted by the temperature of the combustion gas stream formed under the temperature condition of the first reaction zone, whereby it is possible to improve the content of the surface-volatile matter of the carbon black.

If the temperature in the first reaction zone is less than 1,200° C., the production of the carbon black may be difficult due to the insufficient reaction with the raw material oil in the second reaction zone. In addition, since the volatile matters present on the surface of the carbon black are so excessively large that they are separated from the surface of the carbon black during the oxidation treatment of the surface of the carbon black, the content of the functional group attached to the surface by the oxidation treatment may be decreased.

On the other hand, when the temperature in the first reaction zone exceeds 1,500° C., an atmosphere sufficient to react with the raw material oil in the second reaction zone may be formed to such an extent that the volatile matters are hardly present on the surface of the carbon black.

The combustion gas stream formed at a temperature of 1,200 to 1,500° C. reacts with the raw material oil in the second reaction zone to form a carbon black, wherein the volatile content of the carbon black can be improved compared with the carbon black formed according to the conventional method (when the combustion gas stream formed at a temperature exceeding 1,500° C. reacts with the raw material oil) due to the incomplete combustion conditions which are relatively harsh.

Typically, the temperature of the second reaction zone in which the combustion gas stream reacts with the raw material oil in the production of the carbon black is preferably 1,600° C. or higher in consideration of the productivity of the carbon black, like the first reaction zone forming the combustion gas stream.

However, the temperature of the second reaction zone according to an embodiment of the present invention may be 1,200 to 1,500° C., which is about 5 to 10% lower than the temperature of the second reaction zone in the combustion reactor for producing the typical carbon black.

Therefore, since the incomplete combustion of the raw material oil can be further promoted in the second reaction zone, it is possible to improve the content of the surface-volatile matter of the carbon black.

The temperature of the second reaction zone can be adjusted in the range of 1,200 to 1,500° C. by improving the content of the raw material oil charged into the second reaction zone. If The content of the raw material oil charged into the second reaction zone becomes so excessively large that the temperature of the second reaction zone is less than 1,200° C., the specific surface area of the carbon black becomes small, which may affect the blackness.

On the other hand, when the temperature in the second reaction zone exceeds 1,500° C., a sufficient temperature atmosphere can be promoted for reacting the combustion gas stream with the raw material oil, so that there is a possibility that the volatile matters are hardly present on the surface of the carbon black.

The content of the volatile matter of the carbon black produced in the step (a) at 950° C. is preferably 1.0% by weight or more, or 1.2% by weight to 1.8% by weight, based on the total weight of the carbon black.

When the content of the volatile matter of the carbon black produced in the step (a) is less than 1.0% by weight, the content of the volatile matter present on the surface of the carbon black is excessively small and the effect of increasing the specific surface area of the carbon black surface is insufficient, whereby there is a possibility that the content of a functional group, which is generated by the oxidation treatment, may be reduced. On the other hand, when the content of the volatile matter of the carbon black produced in the step (a) exceeds 2.0% by weight, the volatile matters present on the surface of the carbon black are excessively large, so that volatile matters are separated from the surface of the carbon black during the oxidation treatment, whereby there is a possibility that the content of the functional group attached to the surface of the carbon black may be decreased by the oxidation treatment.

Further, the content of the volatile matter of the carbon black produced in the step (a) at 600° C. is 10 mg or more per 1 g of carbon black, and the content of the volatile matter at 1,500° C. is preferably 30 mg or more per 1 g of carbon black.

Specifically, the content of hydrogen in the volatile matter of the carbon black produced in the step (a) at 600° C. may be 0.02 mg or more per 1 g of carbon black, the content of carbon monoxide may be 3.0 mg or more per 1 g of carbon black, and the content of carbon dioxide may be 6.0 mg or more per 1 g of carbon black. In addition, the content of hydrogen in volatile matter of the carbon black produced in the step (a) at 1,500° C. may be 0.02 mg or more per 1 g of carbon black, the content of carbon monoxide may be 11.0 mg or more per 1 g of carbon black, and the content of carbon dioxide may be 25.0 mg or more per 1 g of carbon black.

In addition, the specific surface area (N2SA) of the carbon black produced in the step (a) may be 85 to 110 m2/g. When the specific surface area (N2SA) of the carbon black is less than 85 m2/g, there is a possibility that the reaction region to which the functional group is attached by the oxidation treatment on the surface of the carbon black may be insufficient. On the other hand, in order to obtain a carbon black having a specific surface area (N2SA) exceeding 110 m2/g, the combustion temperature of step (a) must be relatively high. In this case, there may be a possibility that the content of the volatile matter on the surface of a carbon black is reduced to less than 1.0% by weight, based on the total weight of carbon black, due to a high combustion temperature.

The step (b) is a subsequent process for carrying out an oxidation treatment on the surface of a carbon black produced by the combustion reaction, and introducing a polar functional group capable of interfering the transfer of electrons to the surface of the carbon black.

Examples of the polar functional group include, but are not limited thereto, an amino group, a halogen group, a sulfonic group, a phosphonic group, a phosphoric group, a thiol group, an alkoxy group, an amide group, an aldehyde group, a ketone group, a carboxyl group, an ester group, a hydroxyl group, an acid anhydride group, an acyl halide group, a cyano group and an azole group.

However, the oxidation treatment of step (b) herein is carried out using ozone, and the polar functional group introduced into the surface of the carbon black through step (b) may be an oxygen-containing functional group. In this case, the step (b) herein is to expand the reaction zone in which the functional group is attached to the surface of the carbon black, following by the proceeding step (a) in which the volatile matter is 1.0% by weight or more on the surface of the carbon black.

Accordingly, the content of the volatile matter of the oxidized carbon black at 950° C. in the step (b) may be 3.5% by weight or more, or 4.0% by weight to 5.0% by weight, based on the total weight of the carbon black.

If the content of the volatile matter of the oxidized carbon black is less than 3.5% by weight in the step (b), the content of the functional group required for exerting the high resistivity characteristic of the carbon black may be insufficient.

The content of the volatile matter of the carbon black oxidized at 600° C. in the step (b) is preferably 40 mg or more per 1 g of carbon black, and the content of the volatile matter at 1,500° C. is preferably 30 mg or more per 1 g of carbon black.

Specifically, the content of hydrogen in the volatile matter of the carbon black oxidized in the step (b) at 600° C. may be 0.02 mg or more per 1 g of carbon black, the content of carbon monoxide may be 11.0 mg or more per 1 g of carbon black, and the content of carbon dioxide may be 30.0 mg or more per 1 g of carbon black. Also, the content of hydrogen in the volatile matter of the carbon black oxidized in the step (b) at 1,500° C. may be 4.0 mg or more per 1 g of carbon black, the content of carbon monoxide may be 25.0 mg or more per 1 g of carbon black, and the content of carbon dioxide may be 0.5 mg or more per 1 g of carbon black.

Further, the specific surface area (N2SA) of the carbon black oxidized in the step (b) may be 90 to 120 m2/g.

Finally, the surface resistance of the carbon black oxidized in the step (b) is 1011 Ω·m or more, which can exhibit the surface characteristics as a carbon black of high resistivity.

Known methods for preparing a carbon black of high resistivity include a method of coating the surface of the carbon black with a resin to improve the resistivity, or a method of introducing a polar functional group by a generally known oxidation treatment to improve the resistivity.

The method of coating the surface of the carbon black with a resin to improve the resistivity has the problems in that a separate coating process is required for the surface of the carbon black, that the produced carbon black has an uneven surface resistivity due to the difficulty of uniform coating of the resin on the carbon black particles, and that, when the carbon black is coated with the resin after oxidation treatment in advance, the carbon black may be aggregated or the uniformity of the coated carbon black may be deteriorated.

On the other hand, according to the present invention, it is possible to increase the content of the surface volatile matter of the carbon black before the oxidation treatment by controlling the temperature of the reaction zone in the combustion reactor when carbon black is produced from the raw material. Accordingly, the present invention has an advantage that it is possible to prepare a carbon black of high resistivity without performing any separate step (for example, coating the surface of a carbon black with a resin) other than a process for oxidizing the surface of the carbon black.

Further, in case only the oxidation treatment is performed on the surface of a carbon black without considering the content of the surface volatile matter of the carbon black, the obtained carbon black has a problem in that it lacks a functional group on the surface of the carbon black. For this reason, it would be preferred to prepare a carbon black of high resistivity according to the present invention.

Hereinafter, specific embodiments of the present invention will be described. It is to be understood, however, that the following examples is to illustrate or explain the present invention only, but is not intended to limit it.

A Method for Preparing a Carbon Black

Example 1

After a device having a combustion reactor and an oxidation reactor connected to the combustion reactor was prepared, 50 g of N234 grade carbon black was produced in the combustion reactor.

The temperature of a first reaction zone and a second reaction zone was maintained at 1,400° C.

Subsequently, 50 g of the produced carbon black was transferred to an oxidation reactor, and ozone having the concentration of 62 g/m3 was supplied into the oxidation reactor at a rate of 0.5 L/min to perform the oxidation treatment for 2 hours.

Example 2

A carbon black was prepared in the same manner as in Example 1, except that the temperature of the first reaction zone and the second reaction zone in the combustion reactor was maintained at 1,500° C.

Example 3

A carbon black was prepared in the same manner as in Example 1, except that the temperature of the first reaction zone and the second reaction zone in the combustion reactor was maintained at 1,200° C.

Comparative Example 1

A carbon black was prepared in the same manner as in Example 1, except that the temperature of the first reaction zone and the second reaction zone in the combustion reactor was maintained at 1,600° C.

Comparative Example 2

A carbon black was prepared in the same manner as in Example 1, except that the temperature of the first reaction zone and the second reaction zone in the combustion reactor was maintained at 1,000° C.

Property Evaluation of a Carbon Black

The contents of the volatile matters, the specific surface areas and the surface resistances for the carbon blacks prepared according to each of the temperatures in Examples and Comparative Examples were evaluated, and the results thereof are shown in Tables 1 and 2 below.

(1) The content of the volatile matter ($V_m$) of a carbon black was measured by weight change of the carbon black after heating the prepared carbon black under an $N_2$ atmosphere at 950° C. for 7 minutes.

(2) The content of the functional group on the surface of a carbon black was measured according to TPD-MS analysis by the kind of gases vaporized at the temperature conditions shown in Table 1.

(3) The specific surface area ($N_2SA$) was measured according to ASTM D3037-88.

(4) The surface resistance was measured using MCP-T610 manufactured by Mitsubishi Co., Ltd. as follows.

The carbon blacks prepared in Examples and Comparative Examples were mixed with an ethylene vinyl acetate (EVA) resin (LG Chem, EC28005) such that the contents of each of these carbon blacks became 15% by weight, and the mixture was compounded using an internal mixer (HAAKE Rheocord 90) for about 15 minutes and molded into a sheet shape of a predetermined size with a hot press.

The size of the sheet is 10 cm in width and length, and 2 mm in thickness. The volume resistance was measured 9 times using an EVA sheet prepared by mixing the carbon black, and the averages thereof were shown as the result values.

TABLE 1

| Classification | | 600° C. (mg/CBg) | | | 1,500° C. (mg/CBg) | | | Total sum (mg/CBg) |
|---|---|---|---|---|---|---|---|---|
| | | $H_2$ | CO | $CO_2$ | $H_2$ | CO | $CO_2$ | |
| Example 1 | Before oxidation treatment | 0.02 | 4.4 | 8.4 | 3.7 | 28.6 | 0.7 | 45.5 |
| | After oxidation treatment | 0.03 | 12.2 | 37 | 4.3 | 29.7 | 0.5 | 84.1 |
| Example 2 | Before oxidation treatment | 0.1 | 4.1 | 13.8 | 4.7 | 19.4 | 0.40 | 42.4 |
| | After oxidation treatment | 0.15 | 8.4 | 38.3 | 4.9 | 20.0 | 0.44 | 72.2 |
| Example 3 | Before oxidation treatment | 0.5 | 6.0 | 7.0 | 3.1 | 25.2 | 3.2 | 44.0 |
| | After oxidation treatment | 0.10 | 10.5 | 22.8 | 4.0 | 31.1 | 0.5 | 69.0 |
| Comparative Example 1 | Before oxidation treatment | 0.18 | 1.4 | 4.0 | 4.4 | 12.2 | 0.3 | 22.5 |
| | After oxidation treatment | 0.04 | 10.5 | 21.1 | 4.0 | 20.6 | 0.4 | 56.6 |
| Comparative Example 2 | Before oxidation treatment | 0.10 | 3.4 | 3.7 | 3.8 | 8.2 | 0.3 | 19.5 |
| | After oxidation treatment | 0.10 | 6.3 | 21.0 | 4.1 | 19.5 | 0.4 | 51.4 |

TABLE 2

| Classification | | pH | Specific surface area ($N_2SA$) | Volatile matter content (Vm) (wt %) | Surface resistance ($\Omega \cdot m$) 230° C., 20 min |
|---|---|---|---|---|---|
| Example 1 | Before oxidation treatment | 10.3 | 102 | 1.03 | $10^8$ |
| | After oxidation treatment | 2.7 | 104 | 4.75 | $10^{13}$ |
| Example 2 | Before oxidation treatment | 9.1 | 104 | 0.98 | $10^8$ |
| | After oxidation treatment | 2.7 | 109 | 4.07 | $10^{12}$ |
| Example 3 | Before oxidation treatment | 9.5 | 96 | 1.30 | $10^9$ |
| | After oxidation treatment | 2.7 | 99 | 3.95 | $10^{11}$ |

TABLE 2-continued

| Classification | | pH | Specific surface area (N$_2$SA) | Volatile matter (Vm) content (wt %) | Surface resistance (Ω · m) 230° C., 20 min |
|---|---|---|---|---|---|
| Comparative Example 1 | Before oxidation treatment | 9.7 | 105 | 0.54 | $10^7$ |
| | After oxidation treatment | 2.7 | 114 | 3.43 | $10^{10}$ |
| Comparative Example 2 | Before oxidation treatment | 10.2 | 82 | 0.51 | $10^7$ |
| | After oxidation treatment | 2.7 | 87 | 2.58 | $10^8$ |

The results of the above Tables 1 and 2 show that the contents (after oxidation treatment) of the surface-functional groups and the volatile matters of the carbon blacks prepared according to Examples 1 to 3, in which the temperatures of the first reaction zone and the second reaction zone in the combustion reactor were maintained at 1,200° C. to 1,500° C., are higher than those of the carbon blacks prepared according to Comparative Example 1, in which the temperatures of the first reaction zone and the second reaction zone in the combustion reactor were maintained at 1,600° C. Further, it can be confirmed that the surface resistances of carbon black, a final product, are also higher than those of Comparative Example 1.

On the other hand, in case of Comparative Example 2 in which the temperatures of the first reaction zone and the second reaction zone in the combustion reactor were maintained at 1,000° C. It can be confirmed that the carbon blacks are incompletely formed due to the excessively low reaction temperatures, whereby the contents of the surface-functional groups and volatile matters are not secured sufficiently.

As illustrated according to the embodiments of the present invention, it will be apparent to a person who has an ordinary knowledge in the art that various corrections and modifications of the present invention by addition, change or deletion of the constitutive components may be made without departing from the spirit of the invention, as set forth in the appended claims. The above modifications and corrections can be also said to be fallen within the scope of the present invention.

What is claimed is:

1. A method for preparing a carbon black, comprising:
    producing a carbon black in a combustion reactor, comprising:
        burning a fuel oil with heated oxygen in a first reaction zone of the combustion reactor to reach a reaction temperature ranging from 1,200° C. to 1,500° C. and forming a stream of a combustion gas;
        reacting the stream of the combustion gas with a raw material oil in a second reaction zone of the combustion reactor downstream of the first reaction zone, thereby producing the carbon black, wherein a temperature of the second reaction zone ranges from 1,200° C. to 1,500° C.; and
        lowering a temperature of the carbon black in a third reaction zone of the combustion reactor downstream of the second reaction zone; and
    transferring the carbon black produced in the combustion reactor to an oxidation reactor and oxidizing the carbon black by adding ozone to the oxidation reactor, wherein oxidizing occurs by reacting carbon black with ozone, and a pH of the carbon black before the oxidization is above 7,
    wherein a surface resistance of the carbon black oxidized in the oxidation reactor is $10^{11}$ Ω·m or more,
    wherein a content of a volatile matter of the carbon black produced in the oxidation reactor at 600° C. is 40 mg or more per 1 g of the carbon black, and the content of the volatile matter at 1,500° C. is 30 mg or more per 1 g of the carbon black,
    wherein a content of a volatile matter of the carbon black produced in the oxidation reactor at 950° C. is 3.5% by weight or more, based on the total weight of the carbon black, and
    wherein a specific surface area (N$_2$SA) of the carbon black produced in the oxidation reactor ranges from 90 m$^2$/g to 120 m$^2$/g.

2. The method for preparing a carbon black according to claim 1, wherein a content of a volatile matter of the carbon black produced in the combustion reactor at 950° C. is in the range from 1.0% by weight or more to less than 2.0% by weight, based on the total weight of the carbon black.

3. The method for preparing a carbon black according to claim 1, wherein a content of a volatile matter of the carbon black produced in the combustion reactor at 600° C. is 10 mg or more per 1 g of the carbon black, and a content of the volatile matter at 1,500° C. is 30 mg or more per 1 g of the carbon black.

4. The method for preparing a carbon black of high resistivity, according to claim 1, wherein a specific surface area (N$_2$SA) of the carbon black produced in the combustion reactor is in the range from 85 m$^2$/g to 110 m$^2$/g.

5. The method for preparing a carbon black according to claim 1, wherein the pH of the carbon black before the oxidization is above 9.1.

6. The method for preparing a carbon black according to claim 1, wherein the reaction temperature of the first reaction zone ranges from 1,200° C. to less than 1,400° C.

7. The method for preparing a carbon black according to claim 1, wherein the temperature of the second reaction zone ranges from 1,200° C. to less than 1,400° C.

* * * * *